Figure 1:
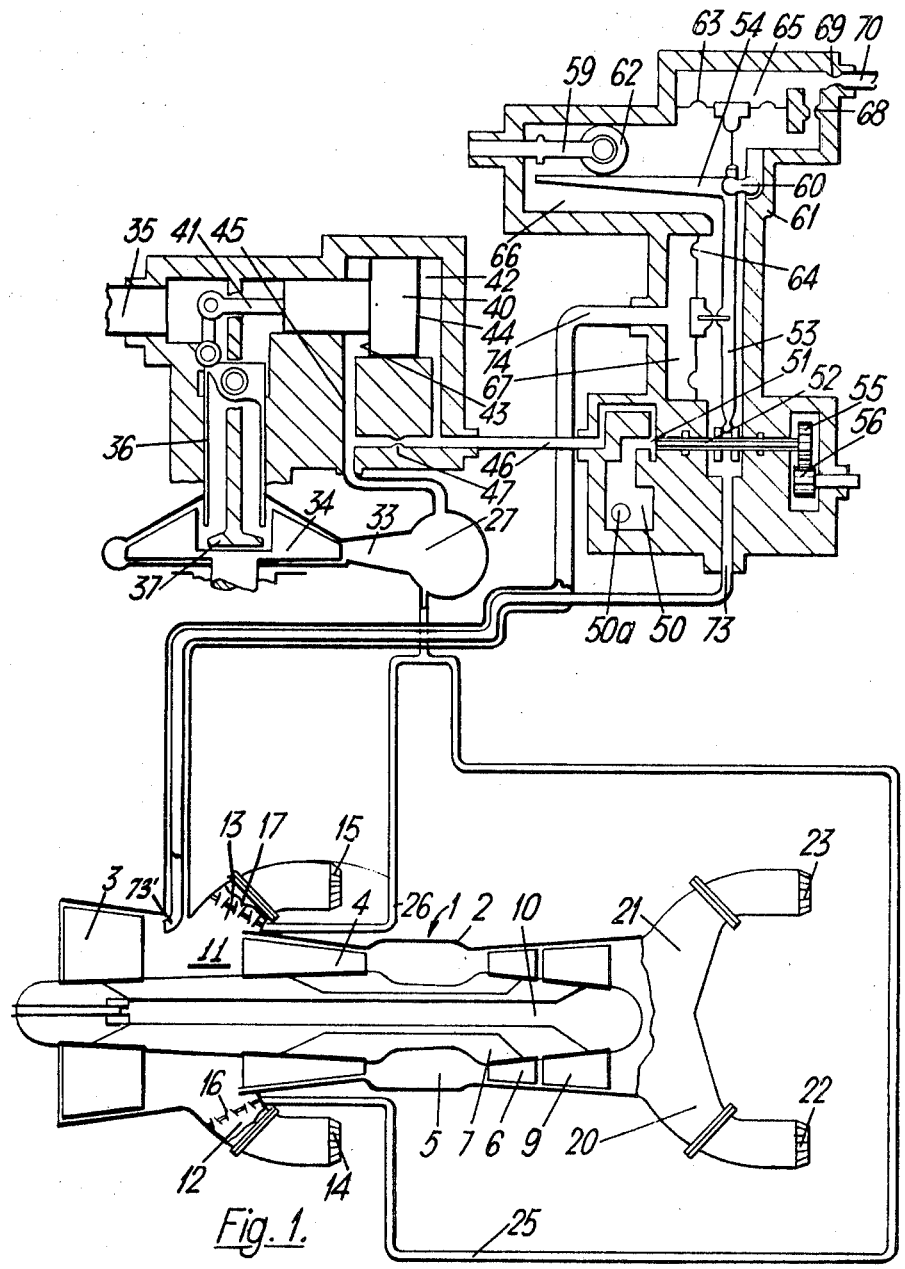

United States Patent

[11] 3,601,990

| [72] | Inventor | Christopher Linley Johnson<br>Derby, England |
|---|---|---|
| [21] | Appl. No. | 835,082 |
| [22] | Filed | June 20, 1969 |
| [45] | Patented | Aug. 31, 1971 |
| [73] | Assignee | Rolls-Royce Limited<br>Derbyshire, England |
| [32] | Priority | June 24, 1968 |
| [33] | | Great Britain |
| [31] | | 30104/68 |

[54] GAS TURBINE JET PROPULSION ENGINE
8 Claims, 2 Drawing Figs.

[52] U.S. Cl................................................ 60/224,
60/236, 60/243, 60/39.28
[51] Int. Cl........................................ F02k 3/02,
F02c 9/08
[50] Field of Search........................................ 60/224,
226, 39.28, 243, 242, 241, 236

[56] References Cited
UNITED STATES PATENTS

| 2,641,105 | 6/1953 | Drake............................ | 60/39.28 X |
| 2,711,073 | 6/1955 | Atkinson......................... | 60/39.28 |
| 2,988,881 | 6/1961 | Reggio ............................ | 60/39.28 |
| 3,020,717 | 2/1962 | Pearce, Jr........................ | 60/39.28 |
| 3,029,601 | 4/1962 | Arnberg et al................. | 60/39.28 X |
| 3,054,254 | 9/1962 | Hopper .......................... | 60/243 X |
| 3,094,839 | 6/1963 | Kinney ........................... | 60/39.28 X |
| 3,325,997 | 6/1967 | Freeman et al................. | 60/226 |
| 3,327,759 | 6/1967 | Lewis.............................. | 60/39.28 X |
| 3,472,027 | 10/1969 | Snow et al. .................... | 60/236 |
| 3,479,823 | 11/1969 | Parnell et al.................. | 60/224 |

FOREIGN PATENTS

| 851,153 | 10/1960 | Great Britain................ | 60/224 |

Primary Examiner—Al Lawrence Smith
Attorney—Cushman, Darby & Cushman

ABSTRACT: A gas turbine jet propulsion engine having compressor means, main combustion equipment, turbine means and first nozzle means in flow series; second nozzle means which receive compressed air from at least part of the compressor means via conduit means which bypass the main combustion equipment and turbine means; additional combustion equipment for burning fuel in the said conduit means; a fuel supply control unit for controlling the supply of the said fuel, measuring means for measuring the dynamic pressure in the conduit means upstream of the additional combustion equipment and for measuring a pressure functionally related to the dynamic pressure at the second nozzle means when fuel is supplied to the additional combustion equipment; and control means which are acted upon by said measuring means and which control the fuel supply to the additional combustion equipment to maintain a substantially constant relationship between the said dynamic pressures in the conduit means upstream of the additional combustion equipment and at the second nozzle means.

Inventor
CHRISTOPHER LINLEY JOHNSON

By
Cushman, Darby & Cushman
Attorneys

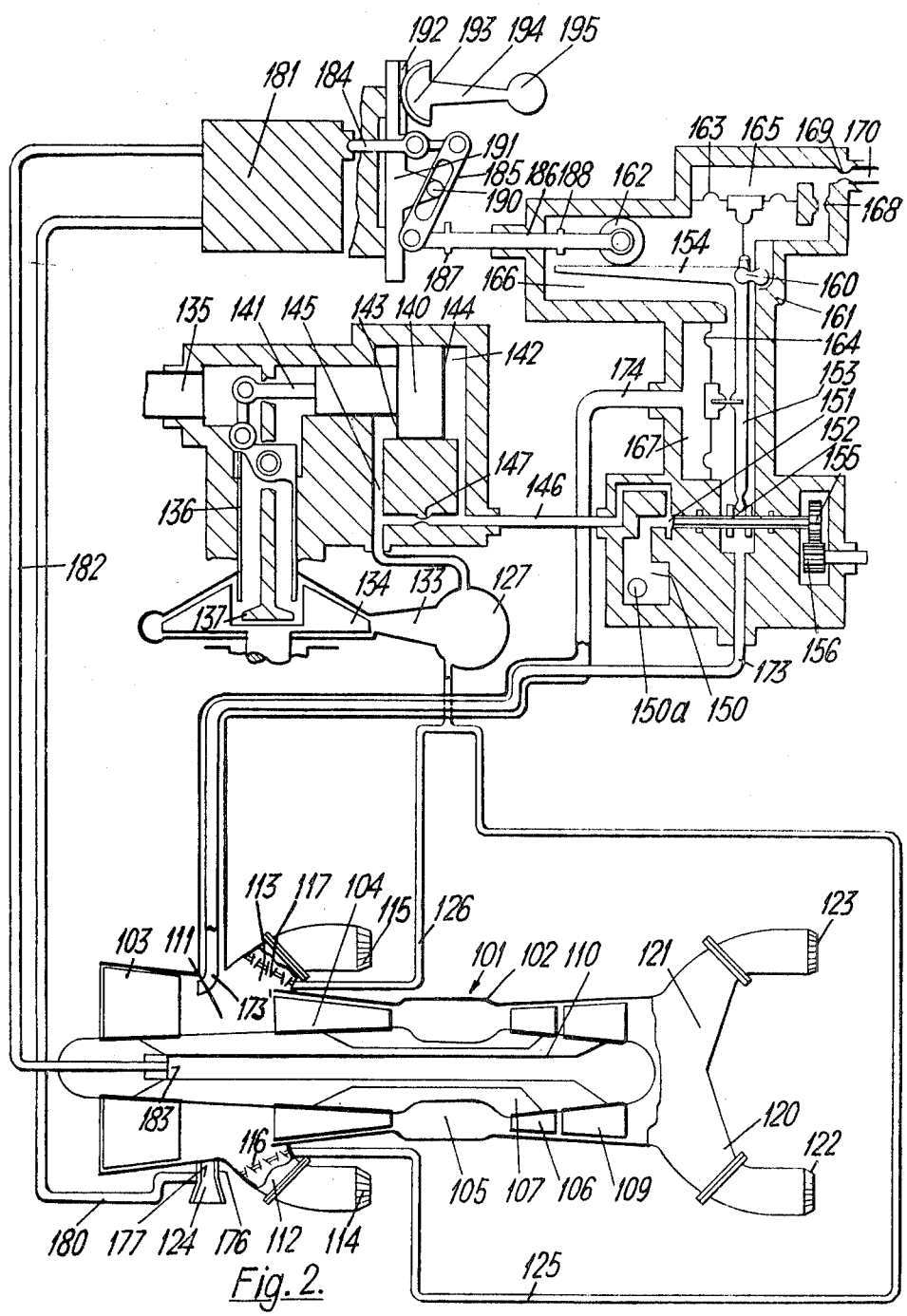

GAS TURBINE JET PROPULSION ENGINE

This invention concerns a gas turbine jet propulsion engine.

According to the present invention, there is provided a gas turbine jet propulsion engine having compressor means, main combustion equipment, turbine means and first nozzle means in flow series; second nozzle means which receive compressed air from at least part of the compressor means via conduit means which bypass the main combustion equipment and turbine means; additional combustion equipment for burning fuel in the said conduit means; a fuel supply control unit for controlling the supply of the said fuel, measuring means for measuring the dynamic pressure in the conduit means upstream of the additional combustion equipment and for measuring a pressure functionally related to the dynamic pressure at the second nozzle means when fuel is supplied to the additional combustion equipment; and control means which are acted upon by said measuring means and which control the fuel supply to the additional combustion equipment to maintain a substantially constant relationship between the said dynamic pressures in the conduit means upstream of the additional combustion equipment and at the second nozzle means. The means for measuring the functionally related pressure may comprise a choked restriction one side of which is open to the atmosphere.

The control means may comprise a bell crank lever mounted on a fulcrum, the two arms of the bell crank lever being respectively subjected by said measuring means to forces which tend to rotate the bell crank lever in opposite angular senses about the fulcrum.

The bell crank lever may control the output of a pump adapted to supply fuel to the additional combustion equipment.

The control means may also be acted upon by a temperature measuring means which measures the temperature in the conduit means.

The temperature measuring means may comprise a duct which is arranged to receive air from the said conduit means, the duct having a portion of the flow through which is sonic at all or most engine speeds, and at least one thermocouple disposed in said portion.

A phase advance device may be provided which advances the phase of a signal received from the temperature measuring means in accordance with the rate of change of said temperature, the phase advance device acting on the control means in accordance with the value of this phase-advanced signal. Preferably, the degree of phase advance effected by the phase advance device is controlled in dependence upon the rate of change of engine speed.

The invention is illustrated, merely by way of example, in the accompanying drawings, in which FIG. 1 is a diagrammatic section through an engine and fuel system according to one embodiment of the invention, and FIG. 2 is a similar section through an engine and fuel system according to another embodiment of the invention.

In the FIG. 1 embodiment, there is shown a gas turbine jet propulsion engine 1 having an engine casing 2 within which there are mounted in flow series a low pressure compressor 3, a high pressure compressor 4, main combustion equipment 5, a high pressure turbine 6 which drives the high pressure compressor 4 through a shaft 7, and a low pressure turbine 9 which drives the low pressure compressor 3 through a shaft 10.

The air compressed by the low pressure compressor 3 passes into a plenum chamber 11 and part of this air passes therefrom via conduits 12, 13 (which bypass the main combustion equipment 5 and turbines 6, 9) to two diametrically spaced apart progressively variable area front nozzles 14, 15 respectively which are under the control of the pilot, the nozzles 14, 15 being rotatable to vary the direction of the efflux therefrom, whereby to "vector" the thrust. Combustion equipment which includes fuel injectors 16, 17, are provided in the conduits 12, 13 respectively to enable this thrust to be increased when desired, e.g. when used to effect vertical takeoff.

The turbine exhaust gases pass via conduits 20, 21 to two diametrically spaced apart rear nozzles 22, 23 which are also rotatable to vary the direction of the efflux therefrom.

The fuel injectors 16, 17 are supplied with fuel, via pipes 25, 26 from an annular manifold 27. The annular manifold 27 is supplied with fuel through a fuel duct 33 which extends to the high pressure side of a vapor core centrifugal pump 34.

The pump 34 has a fuel inlet 35 the communication between which and the "eye" of the pump is controlled by an inlet throttle 36. The inlet throttle 36 is constituted by a sleeve whose interior may (by means not shown) receive fuel from the fuel inlet 35. The inlet throttle 36 is movable towards and away from a valve seat 37 by a piston 40 to which it is connected by a linkage 41. The piston 40 is movable in a cylinder 42, the piston 40 having oppositely disposed pressure surfaces 43, 44. The pressure surface 43 is open to the pressure in the duct 45 which extends to the manifold 27 and which therefore contains fuel at the pressure prevailing on the high pressure side of the pump 34. The pressure surface 44 is open t the pressure in a duct 46 which communicates with the duct 45 by way of a restriction 47.

The duct 46 communicates with a chamber 50 by way of a variable restriction 51 whose size depends upon the axial position of a valve rod 52. The chamber 50 is connected to drain via a port 50a. The valve rod 52 is connected for axial movement to one arm 53 of a bell crank lever 53, 54. The valve rod 52 is provided with a gear 55 which meshes with an engine driven gear 56. The valve rod 52 is thus continuously rotated inoperation so as to help to prevent it from sticking, whereby it will move more readily on any change in the forces acting on the bell crank lever 53, 54.

It will thus be appreciated that movement of the bell crank lever 53, 54 will adjust the position of the valve rod 52 and will therefore adjust the pressure in the duct 46 and hence the pressure acting on the pressure surface 44. This will cause appropriate adjustment in the position of the inlet throttle 36, whereby to vary the fuel flow to he fuel injectors 16, 17.

The bell crank lever 53, 54, which is pivotally connected by a link 60 to the wall of a housing 61, is movable about a fixed fulcrum constituted by a roller 62 mounted on a rod 59. The arms 53, 54 of the bell crank lever are subjected to two forces which tend to rotate the bell crank lever in opposite angular senses about the roller 62, these two forces being transmitted to the bell crank lever 53, 54 from diaphragms 63, 64.

The housing 61 contains chambers 65, 66, 67. The chambers 65, 66 are separated from each other by the diaphragm 63, and the chambers 66, 67 are separated from each other by the diaphragm 64. The chambers 65, 66 communicate with each other by way of a restriction 68.

The chamber 65 communicates via a restriction 69 with a duct 70 which is open to atmosphere.

Since fuel is supplied to the fuel injectors 16, 17 only at or near top speed, the nozzles 14, 15 will be choked at this time and the dynamic head thereat will therefore be a fixed fraction of the total pressure. Accordingly, the pressure acting on the diaphragm 63 at this time will be functionally related to the dynamic pressure at the fuel injectors 16, 17.

The chamber 66 communicates with a duct 73, which is arranged to receive the total pressure prevailing at a point 73' immediately upstream of the region in which the fuel is burned at the fuel injectors 16, 17 the mass flow through the point 73' being substantially the same as that through the nozzles 14, 15.

The chamber 67 communicates with one end of a duct 74 whose opposite end is arranged concentrically about the duct 73 receives the static pressure at the point 73'.

The force on the diaphragm 64 is therefore representative of the dynamic head at the point 73'.

As will be appreciated, if the ratio between the dynamic pressures at the nozzles 14, 15, and that at the point 73' varies from that which balances the bell crank lever 53, 54, movement will occur of the bell crank lever 53, 54 about its roller 62 and this will cause axial movement of the valve rod 52. The pressure in the duct 46 and so on the surface 44 will alter, with the result that the inlet throttle 36 will be moved to a position in which the fuel flow to fuel injectors 16, 17 will alter so as to tend to restore the bell crank lever 53, 54 to its original position.

Thus the fuel flow to the fuel injectors 16, 17 may be such as to maintain the working line of the low pressure compressor 3 the same as it is when there is no fuel supply to the fuel injectors 16, 17, this being achieved by varying the area of the nozzles 14, 15 progressively in accordance with the desired degree of thrust boost.

Alternatively, the nozzles 14, 15 could have two positions, namely a maximum and a minimum area position, which are respectively employed when fuel is, and is not, supplied to the fuel injectors 16, 17. In this case, the fuel supply to the fuel injectors 16, 17 could be varied so that the working line of the low pressure compressor 3 was, except at maximum boost, below its normal level, i.e. the level existing when no fuel is supplied to the fuel injectors 16, 17. This could be achieved by moving the rod 59 (and hence the roller 62) by connecting the latter to a pilot's control lever (not shown).

Yet a further possibility is for the nozzles 14, 15 to have the said two positions, but to control the fuel supply to the fuel injectors 16, 17 so as to maintain the normal working line of the low pressure compressor 3, the engine speed being varied progressively to control the thrust.

As will be appreciated, in the FIG. 1 embodiment, when the roller 62 is fixed, the lever 53, 54 need not be a bell crank lever but may have any convenient form.

The FIG. 2 embodiment is similar to the FIG. 1 embodiment, except in certain respects which will be discussed below. Corresponding parts in FIGS. 1 and 2 have reference numbers which differ by 100.

The bell crank lever 153, 154, which is pivotally connected by link 160 to the wall of a housing 161, is movable about a displaceable fulcrum constituted by a roller 162. The arms 153, 154 of the bell crank lever are subjected to two forces which tend to rotate the bell crank lever in opposite angular senses about the roller 162, these two forces being transmitted to the bell crank lever 153, 154 from diaphragms 163, 164.

The housing 161 contains chambers 165, 166, 167. The chambers 165, 166 are separated from each other by the diaphragm 163, and the chambers 166, 167 are separated from each other by the diaphragm 164. The chambers 165, 166 communicate with each other by way of a restriction 168.

The chamber 165 communicates via a choked restriction 169 with a duct 170 which is open to atmosphere.

Since fuel is supplied to the fuel injectors 116, 117 only at or near top speed, the nozzles 114, 115 will be choked at this time and the dynamic head thereat will therefore be a fixed fraction of the total pressure. Accordingly, the pressure acting on the diaphragm 163 at this time will be functionally related to the dynamic pressure at the fuel injectors 116, 117.

The chamber 166 communicates with a duct 173, which is arranged to receive the total pressure prevailing at a point 173' immediately upstream of the region in which the fuel is burned at the fuel injectors 116, 117, the mass flow through the point 173' being substantially the same as that through the nozzles 114, 115.

The chamber 167 communicates with one end of a duct 174 whose opposite end is arranged concentrically about the duct 173 and receives the static pressure at the point 173'.

The force on the diaphragm 164 is therefore representative of the dynamic head at the point 173'. The device 181 employs known circuits and elements such as a voltage or current sensor, a differentiating circuit, and a phase-advance circuit responsive to the differentiator and to another differentiator which operates upon a signal indicative of speed from the speed sensitive device 183. The theory of the device 181 can be found on "Principles of Automatic Controls" By Floyd E. Nixon, published by Prentice Hall, 1957.

A part of the air compressed by the low pressure compressor 103 is also directed through a plurality of bleed ducts 124, (only one shown).

Each of the bleed ducts 124 has a throat 176 the flow through which is sonic at all or most engine speeds. At least one thermocouple 177 is disposed at the throat 176 and is electrically connected by a cable 180 to a device 181. The device 181 thus receives signals of the temperature ($T_3$) adjacent the inner ends of the ducts 173, 174.

The device 181 comprises, as well known per se, means (not shown) for advancing the phase of any signal received from the thermocouples 177 in accordance with the rate of change of the said temperature. The degree of phase advance effected by the device 181 may be controlled in part in dependence upon the rate of change of engine speed, the device 181 being connected by way of a cable 182 to a speed sensitive device 183.

The device 181 is provided with a push rod 184 whose position depends upon the value of the said phase-advanced signal. The push rod 184 is pivotally connected to one end of a lever 185 whose other end is connected to a push rod 186, the push rod 186 being connected to the roller 162.

The push rod 186 is provided with stops 187, 188 for limiting the degree of control which the thermocouples 177 and device 181 may exercise on the bell crank lever 153, 154 during acceleration and deceleration respectively, to obtain a nondimensional acceleration and deceleration control. This nondimensional acceleration and deceleration control may still be obtained even if the device 181 is omitted by providing two fixed pivots (not shown), abutting the arm 154, in substitution for the roller 162.

The ever 185 is mounted on a fulcrum 190 which is carried by a member 191 provided with a rack 192. The rack 192 meshes with a pinion 193 mounted on a pilot's lever 194. The pilot's lever 194 is pivoted at 195 and, as it is moved about its pivot, the fulcrum 190 is displaced so as to alter the leverage between the push rod 184 and the push rod 186. This enables adjustment to be effected to the flame temperature at the nozzles 114, 115.

As will be appreciated, if the ratio between the dynamic pressures at the nozzles 114, 115, and that at the point 173' varies from that which balances the bell crank lever 153, 154, movement will occur of the bell crank lever 153, 154 about its roller 162 and this will cause axial movement of the valve rod 152. The pressure in the duct 146 and so on the surface 144 will alter, with the result that the inlet throttle 136 will be moved to a position in which the fuel flow to fuel injectors 116, 117 will alter so as to tend to restore the bell crank lever 153, 154 to its original position.

The fuel supply to the fuel injectors 116, 117 may be such that the temperature at the nozzles 114, 115 remains constant irrespective of the ambient temperature.

We claim:

1. A gas turbine jet propulsion engine having compressor means, main combustion equipment, turbine means and first nozzle means in flow series; second nozzle means which receive compressed air from at least part of the compressor means via conduit means which bypass the main combustion equipment and turbine means; additional combustion equipment for burning fuel in the said conduit means; a fuel supply control unit for controlling the supply of the said fuel, measuring means for measuring the dynamic pressure in the conduit means upstream of the additional combustion equipment ans for measuring a pressure functionally related to the dynamic pressure at the second nozzle means when fuel is supplied to the additional combustion equipment; and control means which are acted upon by said measuring means and which control the fuel supply to the additional combustion equipment to maintain a substantially constant relationship between the said dynamic pressures in the conduit means upstream of the additional combustion equipment and at the second nozzle means.

2. An engine as claimed in claim 1 in which the means for measuring the functionally related pressure comprises a choked restriction one side of which is open to the atmosphere.

3. An engine as claimed in claim 1 in which the control means comprises a bell crank lever, a fulcrum on which the bell crank lever is mounted, the bell crank lever having two arms, means respectively transmitting forces from the measuring means to the respective arms of the bell crank lever, tending to rotate it in opposite angular senses about the fulcrum.

4. An engine as claimed in claim 3 comprising a pump adapted to supply fuel to the additional combustion equipment, the bell crank lever controlling the output of the pump.

5. An engine as claimed in claim 1 comprising temperature measuring means to measure the temperature in the conduit means, the control means being acted upon by the temperature measuring means.

6. An engine as claimed in claim 5 in which the temperature measuring means comprises a duct adapted to receive air from the said conduit means, the duct having a portion the flow through which is sonic at all or most engine speeds, and at least one thermocouple disposed in said portion.

7. An engine as claimed in claim 5 in which a phase advance device is provided comprising means to advance the phase of a signal received from the temperature measuring means in accordance with the rate of change of said temperature, the phase advance device acting on the control means in accordance with the value of this phase-advanced signal.

8. An engine as claimed in claim 7 comprising means to control the degree of phase advance effected by the phase advance device in dependence upon the rate of change of engine speed.